UNITED STATES PATENT OFFICE.

LOUIS G. FELLNER, OF LAS VEGAS, TERRITORY OF NEW MEXICO.

IMPROVEMENT IN THE EXTRACT OF YUCCA.

Specification forming part of Letters Patent No. 134,876, dated January 14, 1873.

*To all whom it may concern:*

Be it known that I, LOUIS G. FELLNER, M. D., of Las Vegas, in the county of San Miguel and Territory of New Mexico, have invented a new and useful Improvement in Extract of Yucca, of which the following is a specification:

My invention has for its object to furnish yuccatin or extract of yucca-root, so prepared and put up that it will be protected from moisture, and may be put into market as an article of commerce; and it consists in the extract of yucca, prepared and put up as hereinafter more fully described.

The yucca-root is ground, steeped in water, and pressed. The liquid thus obtained is then evaporated in any suitable evaporating apparatus. The liquid may be evaporated to the proper consistence for molding and then molded in forms, or it may be evaporated to dryness and then melted in forms.

The molds before receiving the extract should be lined with powder, tissue paper, or other suitable substance to prevent adhesion.

The molded extract is then thoroughly dried and done up in paper, put into boxes or other suitable packages, which should be coated with varnish or other suitable preparation to exclude the moisture.

Yuccatin cleans the skin, hair, wool, and other animal substances from foreign matter without destroying their softness, or injuring them in any way; but when applied to vegetable substances it is useless.

Having thus described my invention, I claim as new and desire to secure by Letters Patent—

An extract of yucca-root prepared and put up, substantially as herein shown and described, to enable it to become an article of commerce.

L. G. FELLNER.

Witnesses:
    MAY HAYS,
    FRANK WELERS,
    ARTHUR MORRISON.